United States Patent
Frulla

(10) Patent No.: US 6,598,659 B1
(45) Date of Patent: Jul. 29, 2003

(54) TEMPERATURE CONTROL UNIT FOR DIES OR MOLDS, PARTICULARLY FOR PRESSURE DIE-CASTING OR INJECTION-MOLDING ALUMINUM AND ALLOYS THEREOF, PLASTIC MATERIALS AND THE LIKE

(75) Inventor: Claudio Frulla, Lacchiarella (IT)

(73) Assignee: BBS Motorsport & Engineering GmbH, Schiltach (DE)

( * ) Notice: Subject to any disclaimer, the term of this patent is extended or adjusted under 35 U.S.C. 154(b) by 0 days.

(21) Appl. No.: 09/546,606

(22) Filed: Apr. 10, 2000

(30) Foreign Application Priority Data

Apr. 16, 1999 (IT) .......................................... MI99A0805

(51) Int. Cl.⁷ ........................... B29C 45/73; B22D 27/04
(52) U.S. Cl. ..................... 164/155.6; 164/348; 425/144; 425/552
(58) Field of Search ............................ 164/155.6, 348, 164/122, 126, 128, 458; 425/144, 552; 249/79

(56) References Cited

U.S. PATENT DOCUMENTS

| | | | | |
|---|---|---|---|---|
| 2,948,516 A | * | 8/1960 | Martenelli et al. .......... | 257/192 |
| 4,278,230 A | | 7/1981 | Allen | |
| 4,367,785 A | * | 1/1983 | Allen .............................. | 165/2 |
| 4,902,454 A | * | 2/1990 | Steinbichler et al. ....... | 264/40.6 |
| 4,934,918 A | * | 6/1990 | Outland ..................... | 425/144 |
| 5,452,999 A | * | 9/1995 | Evans ......................... | 425/144 |
| 6,112,804 A | * | 9/2000 | Sachs et al. ................. | 164/348 |
| 6,143,215 A | * | 11/2000 | McCollum et al. ........ | 264/40.1 |

FOREIGN PATENT DOCUMENTS

DE 196 54 531 5/1998

OTHER PUBLICATIONS

Patent Abstracts of Japan, vol. 012, No. 376 (M–750), Oct. 7, 1988 & JP 63 128911 A (Sanden Corp), Jun. 1, 1988 Abstract.
Patent abstracts of Japan vol. 012, No. 419 (M–760), Nov. 8, 1988 & JP 63 157751 A (Toyota Motor Corp), Jun. 30, 1988 Abstract.

* cited by examiner

Primary Examiner—Tom Dunn
Assistant Examiner—Len Tran
(74) Attorney, Agent, or Firm—Daniel O'Byrne

(57) ABSTRACT

A temperature control unit for dies and molds, particularly for pressure die-casting or injection-molding of aluminum and alloys thereof, plastic materials and the like, comprising a die or mold cooling circuit through which pressurized water flows. A water feed pump is connected to the circuit and is adjustable to a pressure which is higher than the evaporation pressure of water at a preheating temperature of the water, which can be detected by a first sensor for detecting the temperature of the water. The circuit includes a circulation pump, a water overflow valve which can be set to a lower pressure than the feed pump, and a heating unit which is controlled by the first temperature sensor. A die or mold temperature sensor is further provided which controls the feed pump.

12 Claims, 2 Drawing Sheets

TEMPERATURE CONTROL UNIT FOR DIES OR MOLDS, PARTICULARLY FOR PRESSURE DIE-CASTING OR INJECTION-MOLDING ALUMINUM AND ALLOYS THEREOF, PLASTIC MATERIALS AND THE LIKE

BACKGROUND OF THE INVENTION

The present invention relates to a temperature control unit for dies or molds particularly for pressure die-casting or injection-molding aluminum and alloys thereof, plastic materials and the like.

It is known that the temperature control of dies or molds, particularly for die-casting aluminum and alloys thereof, currently uses oil-based devices which substantially have a closed circuit for the oil which is designed to perform heat exchange with the die or mold.

The use of oil entails the provision of a heat exchange unit for cooling the oil; such cooling occurs indirectly by transmission of the heat from the oil to the cooling water.

With systems of this type, therefore, it is necessary to have a large mass of circulating oil, with consequent operating costs and with the need to periodically replace the oil, with oil disposal costs.

Another problem further consists in that due to the high heat capacity it is necessary to supply large amounts of energy for the initial step of oil preheating, with consequent high operating costs.

SUMMARY OF THE INVENTION

The aim of the present invention is to solve the above problem, by providing a temperature control unit for dies or molds particularly for pressure die-casting aluminum and alloys thereof which can use water as a heat exchange fluid, with consequent significant savings on installation and operating costs, since there are no disposal problems; moreover, water has a much higher heat exchange rate than oil.

Within the scope of this aim, a particular object of the present invention is to provide a temperature control unit which allows to significantly reduce the thermal shock to the molds or dies, achieving gradual temperature variations, even during cooling, with the possibility to reach very low levels for the temperature of the dies or molds, thus facilitating extraction of the part from the mold or die.

Another object of the present invention is to provide a temperature control unit for molds or dies which by way of its particular constructive characteristics is capable of giving the greatest assurances of reliability and safety in use.

Another object of the present invention is to provide a temperature control unit which can be easily obtained starting from commonly commercially available elements and materials and is also competitive from a merely economical point of view.

This aim, these objects and others which will become apparent hereinafter are achieved by a temperature control unit for dies and molds, particularly for pressure die-casting or injection-molding of aluminum and alloys thereof, plastic materials and the like, characterized in that it comprises a die or mold cooling circuit through which pressurized water flows, a water feed pump being connected to said circuit and being adjustable to a pressure which is higher than the evaporation pressure of water at a preheating temperature of said water, which can be detected by a first sensor for detecting the temperature of said water, said circuit including a circulation pump, a water overflow valve which can be set to a lower pressure than said feed pump, and a heating unit which is controlled by said first temperature sensor, a die or mold temperature sensor being further provided which controls said feed pump.

BRIEF DESCRIPTION OF THE DRAWINGS

Further characteristics and advantages of the present invention will become apparent from the following detailed description of two preferred but not exclusive embodiments of a temperature control unit for dies or molds particularly for pressure die-casting of aluminum and alloys thereof, illustrated only by way of non-limitative example in the accompanying drawings, wherein.

DESCRIPTION OF THE PREFERRED EMBODIMENTS

Figure 1:
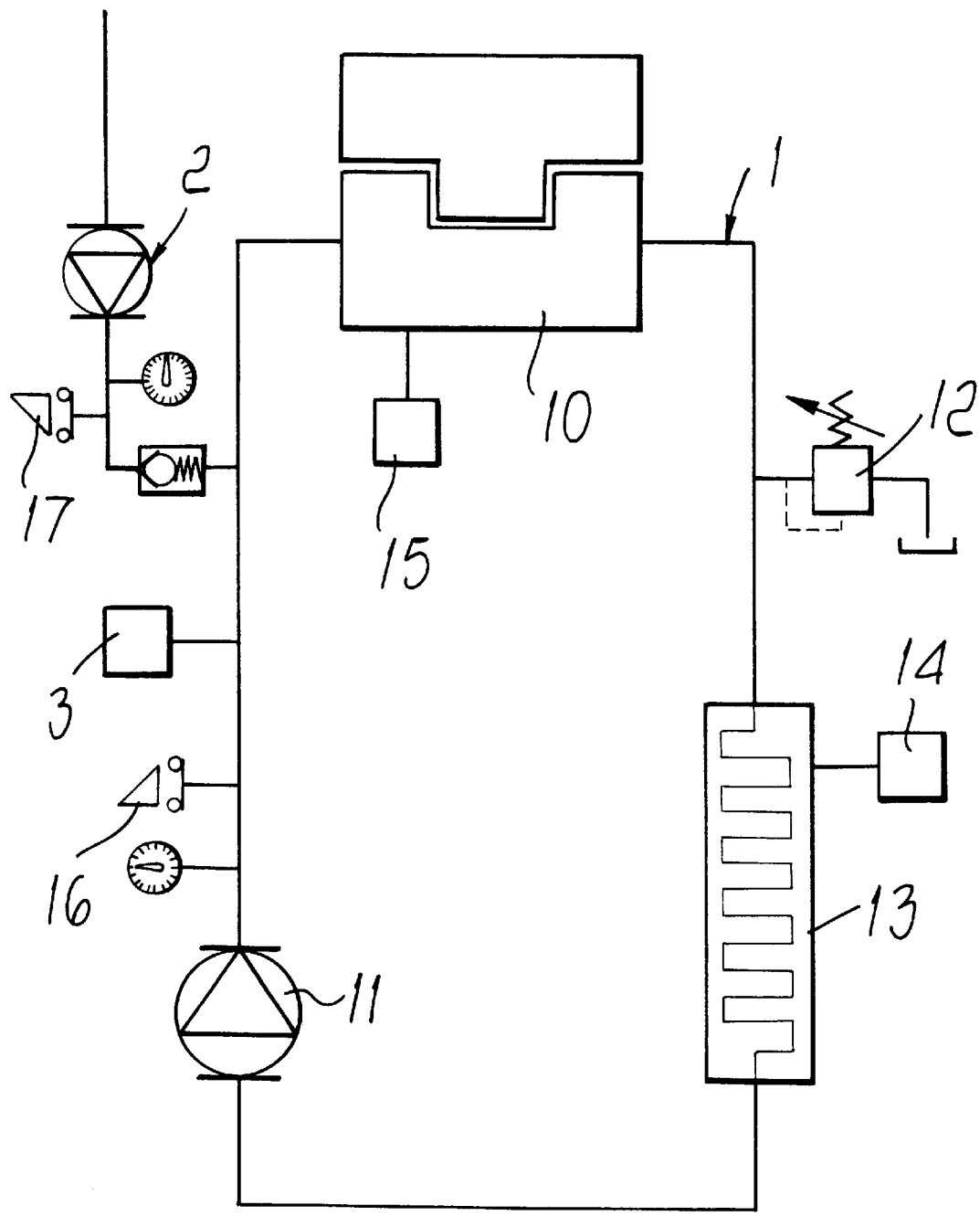
FIG. 1 is a schematic view of a first diagram of a temperature control unit according to a first embodiment of the invention.

With reference to the above figures, and particularly to FIG. 1, the temperature control unit for dies or molds particularly for pressure die-casting or injection-molding aluminum and alloys thereof, plastic materials and the like comprises a die or mold cooling circuit 1 through which pressurized water flows.

The circuit 1 is supplied by a water feed pump 2, set to a pressure which is higher than the evaporation pressure of the water, which is set on a first temperature sensor 3 which detects the temperature of the water inside the circuit, which corresponds in practice to the preheating temperature of the mold or die.

The pump 2 is set to a pressure which is 5 bar higher than the evaporation pressure of water at the temperature detected by the sensor 3.

A circulation pump 11 is provided on the circuit that runs through the die or mold 10 and is designed to circulate the cooling water inside the circuit 1.

A water overflow or discharge valve 12 is provided on the circuit 1 and is equipped with the conventional overpressure safety valve, set to a pressure which is lower than the pressure set on the feed pump 2 and preferably to a pressure which is 3 bar lower than the pressure set on the pump 2.

A heating unit 13 is further provided on the circuit 1 and is controlled by a heating unit temperature sensor 14.

A second temperature sensor 15 is further provided on the circuit, detects the temperature of the die or mold, and controls the feed pump 2.

A minimum-pressure switch 16 is provided on the circuit and is set to a pressure which corresponds to the evaporation pressure that corresponds to the temperature set on the first temperature sensor 3.

On the inlet duct of the feed pump 2 there is also a maximum-pressure switch 17, which is set to a higher pressure than the feed pump 2 and specifically to a value which is 2 bar higher.

In practical operation, first of all the temperature of the die or mold 10 is set on the temperature sensor 15, while the water preheating temperature is set on the temperature sensor 3.

After adjusting the pressure of the feed pump 2 to a value which is 5 bar higher than the evaporation pressure that corresponds to the temperature set on the temperature sensor 3, the overflow valve 12 is set to a pressure which is 3 bar lower than the pressure of the pump.

During the initial step, the feed pump 2 is started in order to pressurize the circuit; when the minimum pressure is reached, the pump, controlled by the minimum-pressure switch, switches off and at the same time the heating unit 13 and the circulation pump 11 are started.

During the step of preheating the water and the die or mold until the water temperature set on the sensor 3 is reached, the volume of the water of the pressurized circuit increases and therefore the pressure increases.

The pressure in excess with respect to the set value is vented by means of the overflow valve 12.

When the water temperature preset on the temperature sensor 3 is reached, the heating unit 13 is switched off.

When production begins, the liquid metal is introduced in the cavity of the die, causing a consequent increase in the temperature of the die with respect to the temperature set on the second temperature sensor 15.

At this point the feed pump 2 is restarted and introduces in the pressurized circuit 1 mains water at ambient temperature, which mixes with the circulating water.

The pump 2 remains active until the temperature of the die or mold has dropped to the value preset on the temperature sensor 15.

The water fed by the feed pump 2 is continuously discharged by the overflow valve 12.

In practical operation, the preheating temperature is preferably 140°, while the temperature of the die or mold is normally set to 180°.

When die-casting begins by introducing liquid metal in the cavity, if the temperature of the mold does not reach the value set on the instrument 1 after the first casting, the cooling circuit is not activated and metal continues to be introduced for subsequent casting operations until the set temperature is reached.

During continuous-cycle operation, the temperature of the pressurized circulating water is always much lower than 140°, since there is a constant feed of cold water which is then expelled by the discharge valve.

It should be noted that the solution according to the invention provides for continuous introduction of mains water, so that differently from what occurs in known solutions there is a very high ΔT which can be controlled at will by acting on the adjustment of the amount of cold water that is introduced under pressure in the cooling circuit.

For an even more powerful cooling cycle, it is sufficient to set on the instrument a temperature which is lower than the temperature of the water of the pressurized circuit; it is also possible to perform a precise and continuous adjustment of the ΔT which eliminates the occurrence of any thermal shock.

Figure 2:
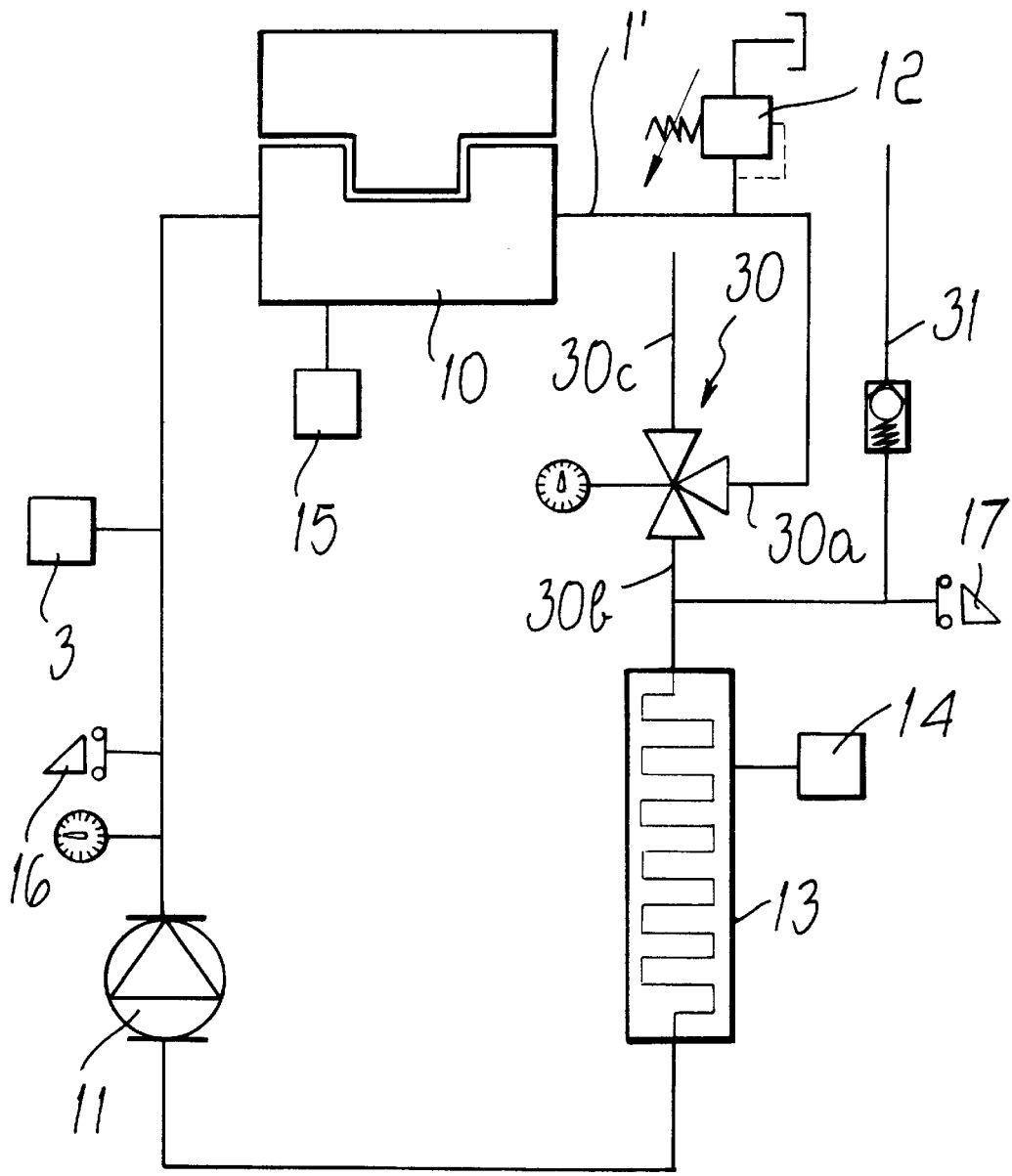
FIG. 2 is a second diagram of a temperature control unit according to a second embodiment of the invention.

FIG. 2 illustrates a second embodiment which is conceptually similar, with the variation of providing a three-way valve, designated by the reference numeral 30, to which a cold water feed circuit, designated by the reference numeral 31, is connected.

The three-way valve 30 is arranged so as to have a first way 30a which is connected to the circuit 1 at the outlet of the die or mold, again designated by the reference numeral 10, a second way 30b which is connected to the feed circuit 31 and to the heating unit 13, and a third way 30c for water discharge.

In practical operation, also in this case the water preheating temperature is set on the temperature sensor 3 and the operating temperature of the die or mold is set on the mold temperature sensor 15.

It is necessary to check beforehand that the feed circuit can supply water at a pressure which is at least 5 bar higher than the evaporation pressure of water at the heating temperature; otherwise it is necessary to install a pressurization pump on the feed line.

The three-way valve 30 is left open and the minimum-pressure switch 16 is set to a pressure of at least 4 bar and in any case 1 bar lower than the pressure of the water in the feed circuit.

The pressure switch 17 related to the maximum pressure is set to a pressure which is approximately 2 bar higher than the water evaporation pressure at the temperature set on the temperature sensor 3.

With the above-described circuit, water is fed from the feed duct into the circuit 1' and the circulation pump is started, gradually closing the way 30c of the three-way valve 30, and the heating unit 13 is switched on.

During the water and die heating step, until the water temperature set on the instrument 3 is reached, the volume of the water in the pressurized circuit increases and therefore the pressure increases.

The pressure in excess of the set pressure is eliminated by means of the overflow valve 12 with safety valve.

When the temperature preset on the sensor 3 is reached, the heating unit 13 is switched off.

When production begins, introducing liquid metal in the casting cavity, the temperature of the mold increases with respect to the temperature set on the instrument 1.

At this point the three-way discharge valve 30 gradually opens, consequently causing water at ambient temperature to be fed again into the pressurized circuit.

The cooling rate in the mold can be adjusted by means of the rate with which the three-way valve 30 opens, until a die temperature equal to the temperature set on the instrument 15 is reached; then the three-way valve 30 closes.

From the above description it is evident that the invention achieves the intended aim and objects and in particular the fact is stressed that temperature control is provided by using water as a heat exchange liquid; water does not cause the typical functional problems of oil but indeed allows to obtain optimum cooling values which can be adjusted at will.

Moreover, the possibility to perform powerful cooling of the die or mold facilitates the extraction of the part from the mold or die by way of the reduction in volume of the male part, which thus allows easier extraction.

The invention thus conceived is susceptible of numerous modifications and variations, all of which are within the scope of the inventive concept.

All the details may further be replaced with other technically equivalent elements.

In practice, the materials used, as well as the dimensions and contingent shapes, may be any according to requirements.

The disclosures in Italian Patent Application No. MI99A000805 from which this application claims priority are incorporated herein by reference.

What is claimed is:
1. A temperature control unit for dies and molds, comprising a die or mold cooling circuit through which pres- surized water flows, a water feed pump being connected to said circuit adapted to feed water into said circuit and being adjustable to a pressure which is higher than the evaporation pressure of water at a preheating temperature of said water, which can be detected by a first sensor for detecting the temperature of said water, said circuit including a circulation pump adapted to circulate water in said circuit, a water overflow valve which can be set to a lower pressure than said feed pump, and a heating unit which is controlled by said first temperature sensor, a die or mold temperature sensor being further provided which controls said feed pump by feeding water, at a temperature lower than the temperature of the water circulating in the circuit, into said circuit to mix with water circulating in said circuit, said water overflow valve continuously discharging the water fed by the water feed pump and mixed with the water circulating in the circuit, when the temperature of the die has to be lowered.

2. The temperature control unit according to claim 1, further comprising means for adjusting the amount of water fed by said feed pump in order to adjust the ΔT of heat exchange with said mold or die.

3. The temperature control unit according to claim 1, wherein said water feed pump is set to a pressure which is 5 bar higher than said evaporation pressure.

4. The temperature control unit according to claim 1, wherein said overflow valve is set to a pressure value which is 3 bar lower than the pressure set on said feed pump.

5. The temperature control unit according to claim 1, further comprising a sensor for detecting the temperature of said heating unit.

6. The temperature control unit according to claim 1, further comprising a minimum-pressure switch which is set to a pressure value which corresponds to said evaporation pressure.

7. The temperature control unit according to claim 1, further comprising a maximum-pressure switch which is interposed on the inlet duct of said feed pump and is set to a value which is 2 bar higher than said feed pump.

8. The temperature control unit according to claim 6, wherein said feed pump is controlled by said minimum-pressure switch.

9. The temperature control unit according to claim 1, wherein said preheating temperature is substantially lower than 200° C. and said temperature of the die or mold is substantially higher than 200° C.

10. The temperature control unit according to claim 1, wherein the water fed by said feed pump is discharged continuously by said overflow valve.

11. A temperature control unit, comprising a mold or die cooling circuit through which pressurized water flows, a three way valve being provided on said water feed circuit and having a first way and a second way which are connected to said circuit and a third way for discharging the water externally, said circuit being connected to a water feed circuit for feeding pressurized water into said circuit at a pressure which is higher than the evaporation pressure of water at a preheating temperature of said water, which can be detected by a first sensor for detecting the temperature of said water, said circuit comprising a circulation pump adapted to circulate water in said circuit, a water overflow valve which can be set to a pressure which is lower than the pressure of said feed circuit, and a heating unit which is controlled by said first temperature sensor, a mold or die temperature sensor being further provided which controls said three-way valve to feed water, at a temperature lower than the water circulating in the circuit, into said circuit to mix with water circulating in said circuit.

12. The temperature control unit according to claim 11, wherein said discharge way of said three-way valve has an adjustable aperture to allow gradual adjustment of the cooling rate of said mold or die.

* * * * *